United States Patent

[11] 3,570,649

| | | |
|---|---|---|
| [72] | Inventor | Rene Fluck<br>Neuhausen am Rheinfall, Switzerland |
| [21] | Appl. No. | 857,736 |
| [22] | Filed | Sept. 15, 1969 |
| [45] | Patented | Mar. 16, 1971 |
| [73] | Assignee | Schweizerische Industrie-Gesellschaft<br>Neuhausen am Rheinfall, Switzerland |
| [32] | Priority | Oct. 14, 1968 |
| [33] | | Switzerland |
| [31] | | 15353/68 |

[54] CONVEYOR ARRANGEMENT FOR CHANGING THE SPACING BETWEEN THE OBJECTS OF A ROW
12 Claims, 11 Drawing Figs.

[52] U.S. Cl. .................................................... 198/34, 198/102
[51] Int. Cl. .................................................... B65g 47/26

[50] Field of Search ........................................... 198/30, 34, 102

[56] References Cited
UNITED STATES PATENTS

| | | | |
|---|---|---|---|
| 3,286,815 | 11/1966 | Shuster et al. ................ | 198/34 |
| 3,379,299 | 4/1968 | Griner ......................... | 198/34 |

*Primary Examiner*—Andres H. Nielsen
*Attorney*—Singer, Stern and Carlberg

ABSTRACT: Two endless conveyors have a common path over part of their length, one conveyor transferring one by one onto the other conveyor the objects of a row at right angles to the direction of conveyance, and one of the two conveyors being composed of transverse bars or rods made to move along their length to increase or to decrease the spacing between the objects of a row.

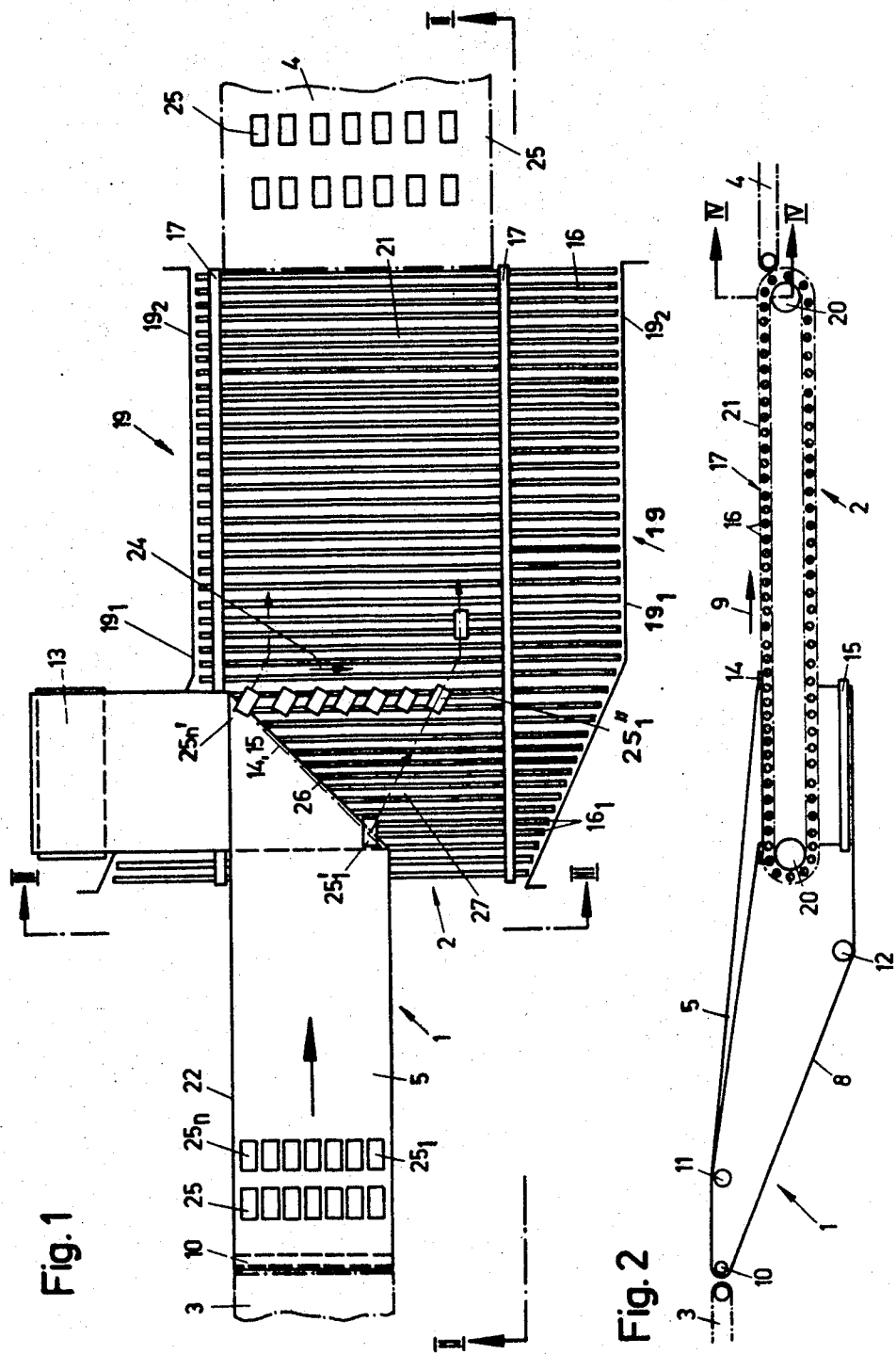

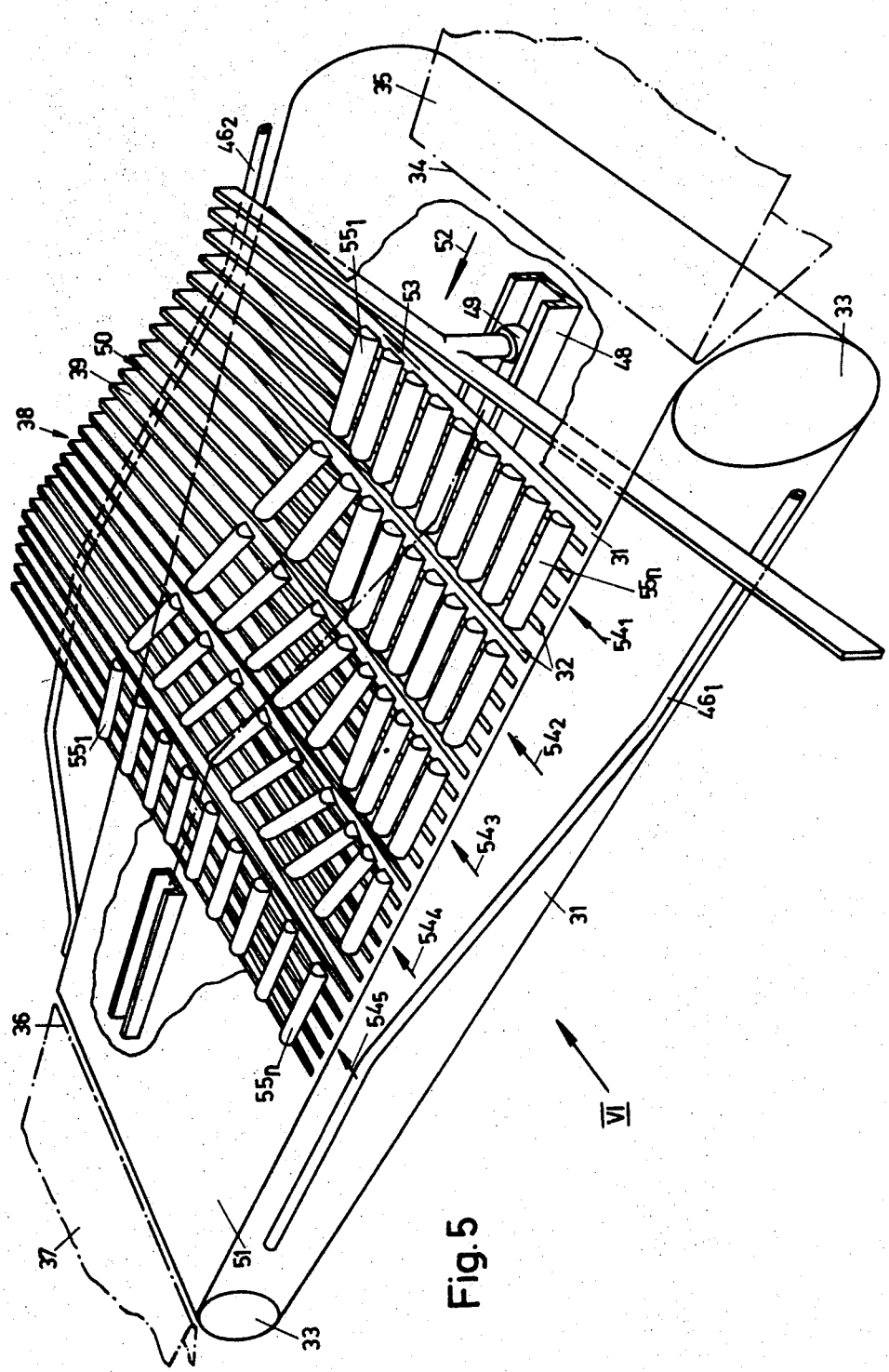

CONVEYOR ARRANGEMENT FOR CHANGING THE SPACING BETWEEN THE OBJECTS OF A ROW

BACKGROUND OF THE INVENTION

The invention relates to a conveyor arrangement for changing the spacing between objects of a row extending crosswise to the direction of conveyance.

An arrangement of this kind is desirable, in particular, for conveying biscuits, crackers, and like baked goods, produced in closely spaced rows, for the purpose of increasing the spacing between the objects of a row, to enable them to be conveyed safely to the machines for individually wrapping each baked good.

SUMMARY OF THE INVENTION

The invention encompasses three different embodiments for accomplishing this.

BRIEF DESCRIPTION OF THE DRAWINGS

The invention will be described, with reference to the FIGS. of the accompanying drawings, wherein:

FIG. 1 is a top view of the first embodiment of the invention;
FIG. 2 is a sectional view taken along line II–II of FIG. 1;
FIG. 5 is a perspective view of the second embodiment of the invention.

DESCRIPTION OF THE PREFERRED EMBODIMENTS

Figure 3:
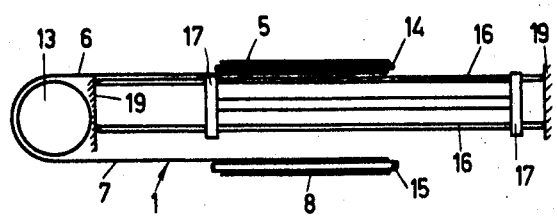
FIG. 3 is a sectional view taken along line III–III of FIG. 1.
Figure 4:
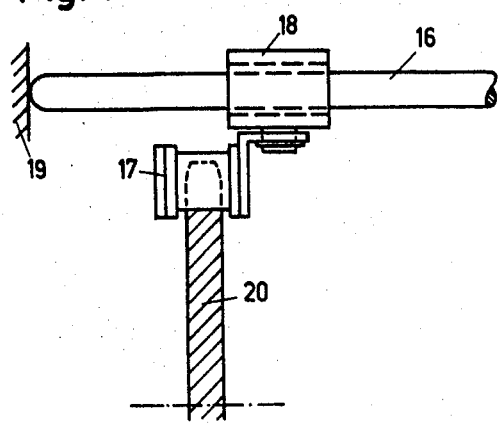
FIG. 4 is a sectional view, on expanded scale, taken along line IV–IV of FIG. 2.
Figure 6:
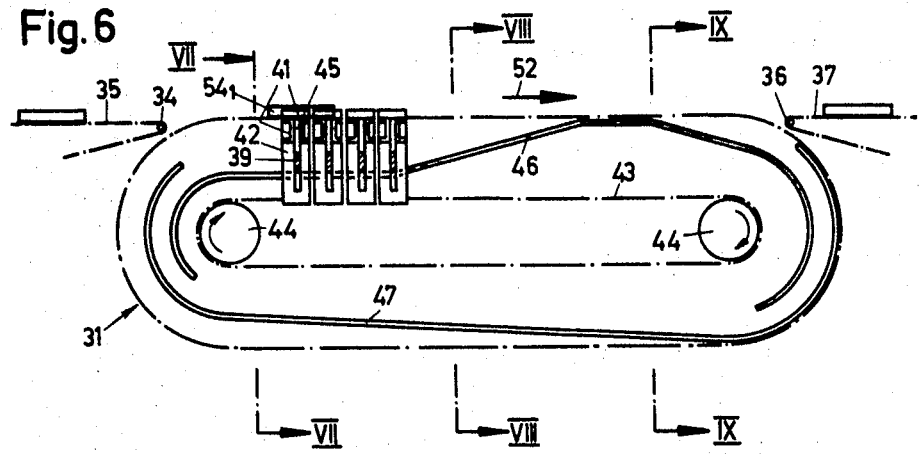
FIG. 6 is a very schematic side view taken in the direction of the arrow of FIG. 5.
Figure 7:
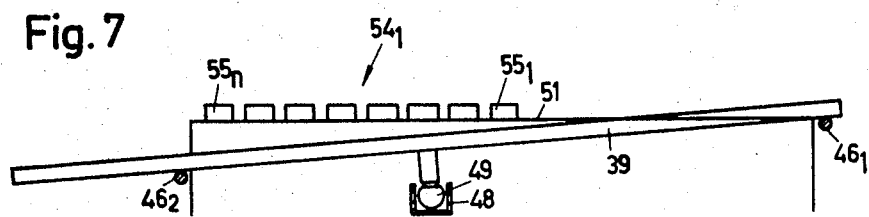
FIG. 7 is a sectional view, on expanded scale, taken along line VII–VII of FIG. 6.
Figure 8:
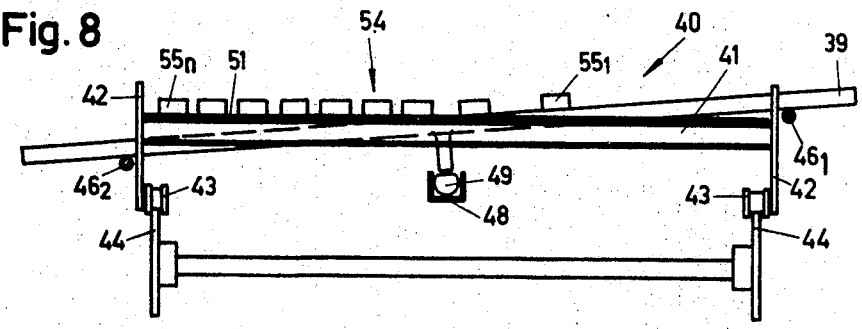
FIG. 8 is a sectional view, on expanded scale, taken along line VIII–VIII of FIG. 6.

With reference to FIGS. 1 to 4, the conveyor arrangement of the invention includes two endless conveyors 1 and 2, positioned between an endless conveyor supply belt 3 and an endless conveyor removal belt 4. The conveyor 1 consists of an endless belt composed of an upper side 5, another upper side 6 running at right angles to the side 5, a lower side 7 running underneath the side 6, and another lower side 8 running underneath the side 5. The belt 1 runs over three rollers 10, 11, and 12, arranged at right angles to the direction of conveyance 9, a roller 13, preferably used to drive the belt, arranged parallel to this direction, and two rollers 14 and 15 positioned at 45° to the direction 9. Roller 14 has a very small diameter, and can be replaced by a nonrotatable, thin rod.

The conveyor 2 consists of an endless chain conveyor moving in a closed path and formed by rods 16 positioned crosswise to the direction of movement 9. Each rod is held in two bearings 18 mounted on respective endless chains 17, which are spaced apart a distance substantially greater than the width of the belt 1 and equal to the width of the removal belt 4. The rods 16 are longer than the distance between the chains 17, and the position of their ends is controlled by two mutually parallel, stationary, vertical, flat surfaces 19. The guide surfaces 19 consist each of two unequally long flat sections $19_1$ and $19_2$, of which the longer, input-end section $19_1$ is turned at an angle to the direction 9, whereas the shorter, output-end section $19_2$ is parallel to this direction.

Each of the two chains 17 runs over two chain wheels 20, one of which is driven. The upper side 5 of the belt 1 runs in the direction 9 and is positioned off center with respect to the useful width of the upper side 21 of the chain conveyor 2, so that the edge 22 of the belt side 5 is nearly aligned with the edge 23 of the useful width of the chain conveyor side 21. Since the section $19_1$, located opposite the edges 22 and 23, at its input end is spaced the farthest from these edges, it is apparent that the rods 16 of the upper side 21 of the chain conveyor 2 will be pushed in the direction of the arrow 24, crosswise to the direction of conveyance 9.

In FIG. 1, two rows of objects 25, such as chocolate coated biscuits, or crackers, are shown on the upper side 5 of the conveyor 1. The several crackers of a row are so narrowly spaced from one another that it would not be possible to convey them in separate files to the wrapping machine without damaging the crackers. It is apparent that of the $n$ crackers of a row the cracker $25_1$ is the first, and the cracker $25_n$ is the last, to pass over the roller (or rod) 14, about which the belt turns through a right angle, and onto the side 21 of the conveyor 2. When the cracker $25_1$ reaches, at position $25'_1$, the rods $16_1$ of the side 21, the combination of the movement of the conveyor 2 in the direction 9 and the transverse movement (arrow 24) of the rods $16_1$ advances the cracker in the direction of the arrow 27, so that it reaches the position $25''_1$ at the same time that the rods $16_1$ reach the end of the oblique section $19_1$ of the two guide surfaces 19. In the meantime, the cracker $25_n$ has passed over the folded edge 26 of the belt 1. All crackers $25_1$ to $25_n$ of the same row now rest on the same forward moving rods $16_1$ that had first accepted the cracker $25_1$. The crackers of a row are now spaced much farther apart than originally. When the rods $16_1$ reach the section $19_2$, the objects conveyed, which has been turned obliquely while passing from the conveyor 1 onto the conveyor 2, are realigned in the direction of forward progress. The rows of objects, correctly aligned and spread out, are delivered by the conveyor 2 to the removal conveyor 4. FIG. 1 shows two rows of crackers 25 on the latter conveyor. At the output end (not shown) of the conveyor 4, the individual crackers of a row can be moved through separate channels to the wrapping machine.

The described arrangement of the invention is very simple but has the disadvantage that only an extremely flexible and wear-resistant belt 1 can withstand the stresses and strains caused by the sharp turn at the folded edge 26. The following embodiments of the invention avoid this disadvantage, but are consequently more costly to manufacture.

The embodiment shown in FIGS. 5 to 9 includes an endless belt 31 provided with transverse slots 32, not all of which are shown in FIG. 5. The belt runs over two rollers 33, which are shown only in FIG. 5. One of the rollers is driven. The belt 31 is arranged between the discharge end 34 of an endless supply belt 35 and the loading end 36 of an endless removal belt 37. The width of the supply belt 35 is appreciably less than that of the removal belt 37, due value being given to the perspective effect in FIG. 5. A chain conveyor 38 is provided having movable flat bars 39 that project through the slots 32 of the belt 31. Each bar 39 is carried along by a driver 40 (see FIG. 8) having two parallel crossbars 41 (see also FIG. 6), U-shaped in cross section, which are connected together at their ends by plates 42 fixed to a respective endless chain 43. Each of the chains runs over two chain wheels 44, of which one is driven. The ends of the flat bars 39 project through slots 45 of the plates 42 and slide over part of their closed path on two inner guides $46_1$ and $46_2$, which are at different heights with respect to the neighboring chain 43. The plate slots 45 are at right angles with respect to the chain 43. To keep FIG. 6 simple, the guides $46_1$ and $46_2$ are shown as a single guide denoted by the reference numeral 46. Over another part of their closed path the ends of the bars 39 slide on two outer guides 47, shown only in FIG. 6, which prevent the bars from falling out of the slots while moving along the underside of the conveyor 38. The ends of the guides 46 and 47 overlap. In FIG. 5 the driver 40 is omitted and of the guides 46 and 47 only a part of the guides $46_1$ and $46_2$ is shown. FIG. 5 shows a stationary guide 48, omitted in FIG. 6, of U-shaped cross section, positioned under the belt 31. A guide head 49 mounted in the center of each bar 39 moves along in this guide. The guide sections $46_1$ and $46_2$ determine the height and inclination of the bars 39 relative to the upper side 51 of the belt 31, as these bars move along the upper side 50 of the conveyor 38; whereas the guide 48 shifts the bars 39 crosswise to the direction of conveyance 52, as shown by the arrow 53, because the guide 48 at the outlet end of the upper side 50 or 51 is shifted, with respect to the input end, transversely to the conveyance direction 52, as indicated in dot-dash line in FIG. 5 and as is apparent by comparing FIGS. 7 and 9. The guide 48 forms a closed path.

Figure 9:
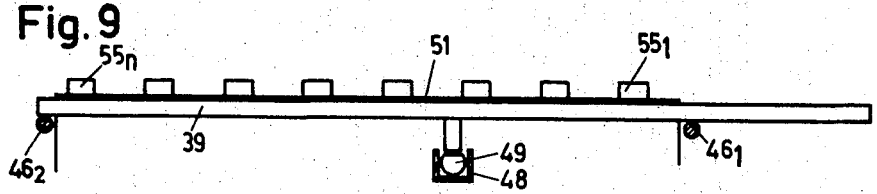
FIG. 9 is a sectional view, on expanded scale, taken along line IX–of FIG. 6.

In FIG. 5 there is shown at the input end of the upper side 51 of the belt 31 a first row $54_1$ of closely spaced objects $55_1$ to $55_n$, such as crackers, which are conveyed in this arrangement from the supply belt 35. In the area of the first row $54_1$ all of the bars 39 still lie beneath the belt side 51. As the belt 31 and the conveyor 38 advance, the guides $46_1$ and $46_2$ raise the bars 39, so that an ever larger part of each bar 39 projects above its slot 32 of the belt 31. First, the cracker $55_1$ is raised above the belt 31 and carried by the conveyor 38, and then each subsequent cracker of the row is successively carried by the conveyor 38. The successive rows of crackers $54_1$ to $54_5$ clearly illustrate this transfer from the belt conveyor to the chain conveyor. In the row $54_5$ the last cracker $55_n$ is also finally carried by the conveyor 38. The guides $46_1$ and $46_2$ now fall, the guide $46_2$ more than the guide $46_1$, so that the bars 38 are horizontal and beneath the upper side 51 at the output end of this side, as shown in FIG. 9. The crackers $55_1$ to $55_n$ again rest on the belt side 51, aligned in the direction of forward progress but as widely spaced apart as they were in the row $54_5$. Thus positioned, the crackers are transferred to the removal belt 37.

Figure 10:
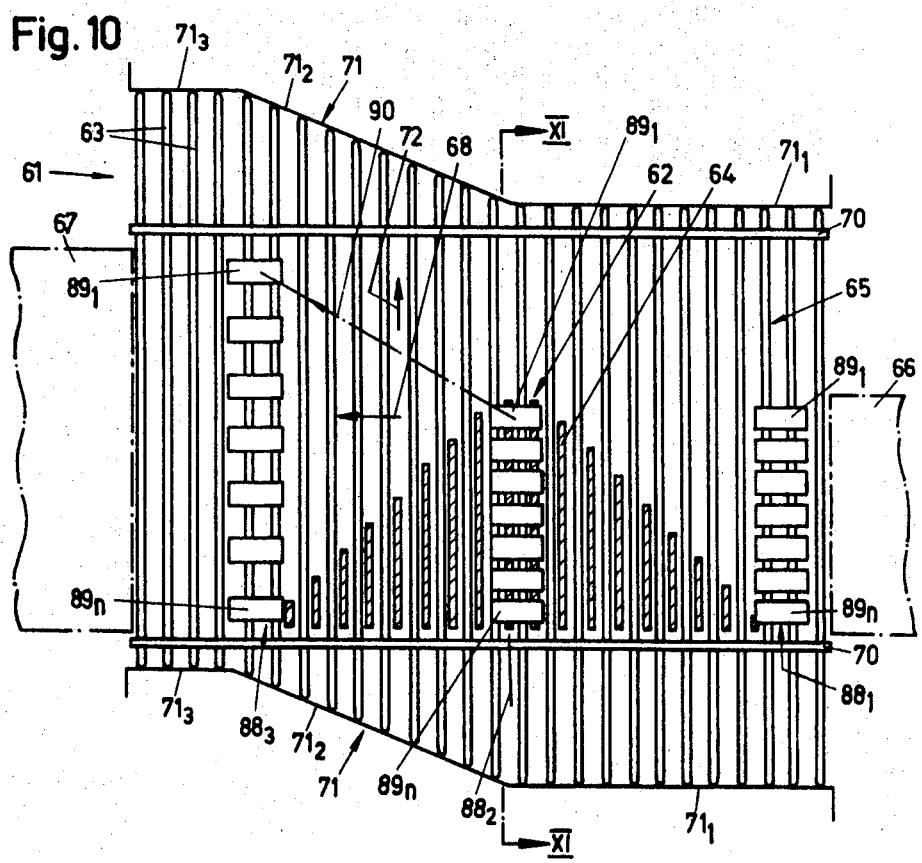
FIG. 10 is a top view of the third embodiment.
Figure 11:
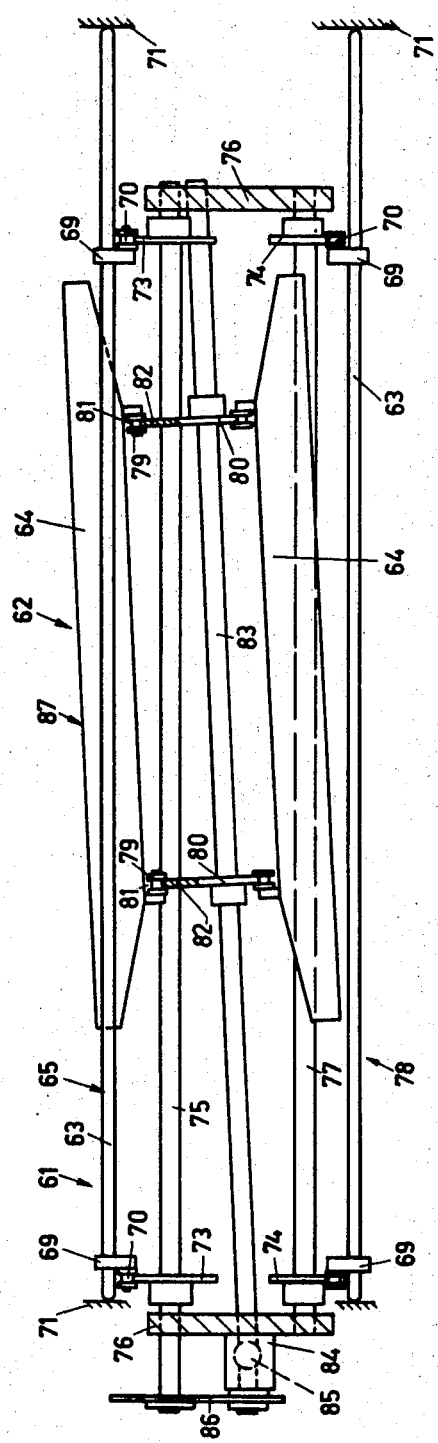
FIG. 11 is a sectional view, on expanded scale, taken along line XI–XI of FIG. 10.

The embodiment shown in FIGS. 10 and 11 has two chain conveyors 61 and 62, the former being formed of rods 63 and the latter of flat bars 64. The bars over part of their closed path project in between the rods 63 and partly above them. To ensure the utmost clarity in FIG. 10 the FIG. shows hatched only that part of the bars 64 raised above the rods 63 of the upper side 65 of the conveyor 61. The conveyors 61 and 62 are positioned between an endless supply belt 66 and an endless removal belt 67, the direction of conveyance being indicated by the arrow 68. Each rod 63 is held free to move longitudinally in two bearings 69 (see FIG. 11), which are fixed to respective endless chains 70. The length of the rods 63 is greater than the spacing between the two chains 70, and their ends are positioned by two mutually parallel guides 71, which each comprise three sections $71_1$, $71_2$, and $71_3$. The input section $71_1$ and the relatively short output section $71_3$ are parallel to the conveyance direction 68, whereas the middle section $71_2$ is oblique to this direction. It is apparent that the rods 63 of the upper side 65 are moved by the middle section $71_2$ transversely to the direction 68, in the direction of the arrow 72.

At the input end each of the chains 70 runs over an upper and lower chain wheel 73 and 74 (see FIG. 10, and at the output end again over upper and lower chain wheels, not shown. The two upper chain wheels 73 are mounted on a shaft 75 that turns in two side plates 76 and is driven in a manner not shown. The lower chain wheels 74 are mounted on a shaft 77 that also turns in the plates 76. The wheels 74, as well as the output-end wheels, serve simply to guide the chains 70 so as to provide for the conveyor 62 a sufficiently large spacing between the upper and lower sides 65 and 78 of the conveyor 61.

The flat bars 64 are fixed to two endless chains 79, which at the input end run over a respective driven chain wheel 80 and at the output end over a guide wheel, not shown. In contrast to the chains 70, the chains 79 do not run in a vertical plane, but instead in a plane slightly canted. The upper sides 81 of the chains 79 do not run freely from the driven wheels 80 to the respective guide wheels; instead they slide on a respective stationary guide rail 82. The height of these two rails is maximum in the plane of FIG. 11, and falls away in a straight line on either side of this plane.

The height of the rails 82 changes in such a manner that in the plane of FIG. 11 the entire bar 64 projects above the neighboring rods 63 of the conveyor 61, but with increasing distance from this plane an ever decreasing length of the bar is raised above the rods. This is clearly shown in FIG. 10, in which the projecting length of a bar 64 is hatched. The two chain drive wheels 80 are mounted on a shaft 83, which is mounted free to turn in the plates 76. A Cardan joint 85, mounted in a housing 84 rigid with the frame, couples one end of the shaft 83 through a chain drive 86 to one end of the drive shaft 75. Consequently, the two conveyors 61 and 62 operate in such a manner synchronously that the bars of the upper side 87 of the conveyor 62 project between the rods 63 of the upper side 65 of the conveyor 61, at first more and more and then less and less.

Along the guide section $71_1$, the rods 63 of the conveyor 61 are not shifted longitudinally. When a row $88_1$ of closely spaced crackers $89_1$ to $89_n$ is moved from the supply conveyor 66 onto the conveyor 61, the crackers, beginning with the cracker $89_n$, are successively raised from the rods 63 by the bars 64. At the end of the guide section $71_1$, all of the crackers $89_1$ to $89_n$ in the row $88_2$ are carried, with unchanged spacing, by the upper side 87 of the conveyor 62. Along the length of the following guide section $71_2$ (where the rods 63 are moved longitudinally in the direction of the arrow 72), the crackers, beginning with the cracker $89_1$, are successively transferred from the conveyor 62 to the conveyor 61. Consequently, the cracker $89_1$ is caused to move in the direction of the arrow 90 (the resultant of the directions 68 and 72) to the illustrated position in the row $88_3$, whereas the cracker $89_n$ undergoes no transverse movement at all. As is the case with the embodiment shown in FIGS. 1 to 4, the objects of a row, which are canted as they are transferred from the conveyor 62 to the conveyor 61, are realigned at the moment when the rods 63 enter the guide section $71_3$. The crackers, in this manner spread apart, are transferred from the upper side 65 of the conveyor 61 to the removal belt 67; and the widened spacing between the crackers of a row remains unchanged, because the guide section $71_3$ is parallel to the direction of conveyance 68.

In a nonillustrated modification of the embodiment shown in FIGS. 10 and 11, the two chains 79 run at the same height in the vertical plane, so that the shaft 83 is horizontal and the Cardan joint 85 is eliminated. The flat bars 64, instead, are assymetrically-shaped, their right ends (as viewed in FIG. 11) being higher with respect to the chains 79 than their left ends. This modification enables the upper edges of the bars 64 to occupy the very position illustrated in FIG. 11. It is apparent that the embodiments shown in FIGS. 5 to 9 and 10 and 11 also permit the spacing between the objects of a row to be reduced, instead of increased. To this end, it is only necessary to use the belt 37 or 67 as the supply belt and the belt 35 or 66 as the removal belt, thereby reversing the direction of forward progress. In practice, this use of the invention will be exceptional.

In certain circumstances it is desirable to center the row of crackers on the supply belt 3, 35, or 66, in order to prevent an offcenter row from interfering with the correct operation of the conveyor arrangement of the invention. With this in view, there has been developed a centering device that can be placed in front of the input end of the conveyor; the description of this device is unnecessary to the present invention.

Although the preferred embodiments of the invention have been described, the scope of, and the breadth of protection afforded to, the invention are limited solely by the appended claims.

I claim:

1. A conveyor arrangement for changing the spacing between objects conveyed in a row extending transversely to the direction of conveyance, including a first endless conveyor (2; 38; 61) having a supporting surface composed of bars or rods (16; 39; 63) extending crosswise to the direction of conveyance and movable in their longitudinal direction, a second endless conveyor (1; 31; 62), said first and second conveyors having a common path length for transferring the objects of a row, successively one by one, from one said conveyor to the other said conveyor over at least part of said common path length, and means (19, etc.) for shifting said bars or rods longitudinally throughout that part of said common path length in which said transfer takes place.

2. The conveyor arrangement as defined in claim 1, wherein said second conveyor is an endless belt (1), and further including a folded edge (26) comprised by said belt extending across the direction of conveyance of said belt and cooperating with said first conveyor so that the row of objects is transferred from said second conveyor to said first conveyor along said folded edge when the conveyor arrangement is used to increase the spacing between objects of a row, and wherein the width of said first conveyor is greater than the width of said second conveyor.

3. The conveyor arrangement as defined in claim 2, wherein said folded edge makes 45° angle with the direction of conveyance of said belt.

4. The conveyor arrangement as defined in claim 1, including bearings (18; 69) for holding said bars or rods free to move longitudinally, a pair of endless driven chains (17; 70) mounting said bearings to advance said bars or rods at right angles to their longitudinal direction, and wherein said shifting means comprises spaced parallel guides (19; 71).

5. The conveyor arrangement as defined in claim 1, wherein said second conveyor is an endless belt (31), and further including transverse slots (32) in said belt through which said bars or rods (39) of said first conveyor can project over at least part of said common path.

6. The conveyor arrangement as defined in claim 5, including a driver (40) for moving each said bar or rod through the closed path of said first conveyor, a pair of endless driven chains (43) mounting said drivers to move the latter, means (46$_1$, 46$_2$) acting on said bars or rods for varying the height and inclination thereof with respect to said chains, and for causing them to project out of said belt slots, and means (47) for preventing said bars or rods from falling out of said slots along the underside of said first conveyor.

7. The conveyor arrangement as defined in claim 6, wherein each said driver comprises two crossbars (41), two means (42) for connecting together each pair of said crossbars and fixed to respective ones of said pair of chains, and a slot in each said last-named means perpendicular to the corresponding said chain for guiding the movement of the corresponding said bar or rod caused by said means for varying the height and inclination thereof.

8. The conveyor arrangement as defined in claim 5, including a guide head (49) incorporated by each said bar or rod at the middle thereof, and a guide (48), comprising said shifting means, for accepting said head free to move therein.

9. The conveyor arrangement as defined in claim 1, wherein said second conveyor (62) has a support surface of bars or rods that is less wide than the width of said first conveyor (61), means (82) for controlling the position, along said common path length, of said second-conveyor bars or rods between said first-conveyor bars or rods so that at first an ever greater, and then an ever smaller, part of the length of said second-conveyor bars or rods appears above said first-conveyor bars or rods along at least part of said common path length.

10. The conveyor arrangement as defined in claim 9, including bearings (69) for holding said bars or rods of said first conveyor free to move longitudinally, a pair of endless driven chains (70) mounting said bearings to advance said first-conveyor bars or rods at right angles to their axes, and wherein said shifting means comprises spaced parallel guides (71) and includes a first path length (71$_1$), comprised by said common path length, that is parallel to the direction of conveyance and a second path length (71$_2$), comprised by said common path length, that is oblique thereto, and said means for controlling the position of said second-conveyor bars or rods moves the latter so that an ever greater and an ever smaller, length thereof projects above said first-conveyor bars or rods while the latter are respectively moving along said shifting means first path length and said shifting means second path length.

11. The conveyor arrangement as defined in claim 1, wherein said first and second conveyors include means (46; 82) for causing transfer of the objects of a row from the other said conveyor to the one said conveyor at a time before or after the said transfer from the one said conveyor to the other said conveyor, and over a length of said common path length throughout which said bars or rods are longitudinally stationary, whereby the spacing between the objects of a row is unchanged by the transfer from the other said conveyor to the one said conveyor.

12. The conveyor arrangement as defined in claim 11, wherein said means (82) for causing transfer causes the objects of a row to be transferred successively.